United States Patent
Votsmeier et al.

(10) Patent No.: US 8,276,438 B2
(45) Date of Patent: Oct. 2, 2012

(54) METHOD FOR VERIFYING THE AGING CONDITION OF A CATALYTIC CONVERTER ON BOARD A VEHICLE

(75) Inventors: Martin Votsmeier, Luetzelsachsen (DE); Juergen Gieshoff, Gelnhausen (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 106 days.

(21) Appl. No.: 12/675,341

(22) PCT Filed: Aug. 29, 2008

(86) PCT No.: PCT/EP2008/061392
§ 371 (c)(1), (2), (4) Date: Nov. 19, 2010

(87) PCT Pub. No.: WO2009/027505
PCT Pub. Date: Mar. 5, 2009

(65) Prior Publication Data
US 2011/0056280 A1    Mar. 10, 2011

(30) Foreign Application Priority Data
Aug. 31, 2007    (EP) .................................... 07115470

(51) Int. Cl.
*G01M 15/10*    (2006.01)
(52) U.S. Cl. .................................................. 73/114.75
(58) Field of Classification Search ................ 73/114.75
See application file for complete search history.

(56) References Cited

U.S. PATENT DOCUMENTS
5,715,676 A    2/1998 Schnaibel et al.
5,732,549 A    3/1998 Treinies et al.
(Continued)

FOREIGN PATENT DOCUMENTS
DE    43 30 997    3/1995
(Continued)

OTHER PUBLICATIONS
International Search Report for PCT/EP2008/061392 mailed Jan. 16, 2009 (in English).

*Primary Examiner* — Freddie Kirkland, III
(74) *Attorney, Agent, or Firm* — Smith, Gambrell & Russell, LLP (57) ABSTRACT

The invention describes a method for determining the light-off temperature of a catalytic converter on board a vehicle. The aging condition of the catalytic converter is determined by means of the method. To test the catalytic converter, the latter is loaded for example with a CO/HC test pulse. During the combustion of the additional CO and HC on the catalytic converter, an axial temperature profile is generated. The position of the maximum of said temperature profile along the catalytic converter is dependent on the current light-off temperature. The temperature profile travels through the catalytic converter and can be measured at the outlet of the catalytic converter as a time-dependent profile. The original axial temperature profile can be inferred from the time-dependent profile. Using a calculation program, the current light-off temperature of the catalytic converter on the vehicle can be determined. The method has the advantage that the test can take place at exhaust-gas temperatures considerably higher than the light-off temperature. In this way, it is ensured that the test pulse does not lead to increased pollutant emissions.

17 Claims, 4 Drawing Sheets

U.S. PATENT DOCUMENTS

| | | |
|---|---|---|
| RE35,887 E * | 9/1998 | Ishii et al. .................. 60/274 |
| 6,408,616 B1 | 6/2002 | Mazur et al. |
| 6,739,176 B2 | 5/2004 | Neuhausen et al. |
| 7,021,044 B2 * | 4/2006 | Mukaihara et al. ............ 60/277 |
| 8,069,712 B2 * | 12/2011 | Frauhammer et al. ..... 73/114.75 |
| 8,091,416 B2 * | 1/2012 | Wang et al. ................ 73/114.75 |
| 2001/0033815 A1 | 10/2001 | Neuhausen et al. |

FOREIGN PATENT DOCUMENTS

| | | |
|---|---|---|
| EP | 1 136 671 | 9/2001 |
| EP | 1 052 385 | 11/2002 |
| JP | 4-60106 | 2/1992 |
| WO | 92/03643 | 3/1992 |
| WO | 95/17588 | 6/1995 |
| WO | 01/49989 | 7/2001 |

* cited by examiner

METHOD FOR VERIFYING THE AGING CONDITION OF A CATALYTIC CONVERTER ON BOARD A VEHICLE

The invention relates to a method for testing the aging condition of a catalytic converter on board a vehicle. Such a method is also referred to as an OBD (On Board Diagnosis) method. The catalytic converter to be tested is preferably a diesel oxidation catalytic converter.

A frequently used measure for the aging condition of a catalytic converter is its light-off temperature. 'Light-off temperature $T_{50}$' refers to the temperature of the catalytic converter at which the latter converts 50% of the pollutants under consideration into harmless components. A catalytic converter generally has a different light-off temperature for each pollutant. In the case of an oxidation catalytic converter, these are light-off temperature for the conversion of carbon monoxide and the light-off temperature for the conversion of hydrocarbons.

There are numerous proposals for monitoring the activity of a catalytic converter on a vehicle. In EP 1 136 671 B1, to test the remaining catalytic activity of a catalytic converter, the difference between the current outlet temperature of the catalytic converter and the light-off temperature of the fresh catalytic converter for the conversion of carbon monoxide is calculated, and the degree of conversion for carbon monoxide is measured. If the measured degree of conversion for carbon monoxide lies below a limit value while the catalytic converter outlet temperature exceeds the light-off temperature of the fresh catalytic converter by a predefined value, this is evaluated as a malfunction of the catalytic converter.

WO 92/03643 proposes, to monitor the catalytic activity of a catalytic converter through which an exhaust gas flows, that the temperature of the catalytic converter be measured along the flow direction continuously or at a plurality of measurement points so as to form a temperature mean value, and that the temperature of the catalytic converter be measured at least one measurement point so as to form a temperature local value, and that the temperature mean value be compared with the temperature local value in order to derive a statement regarding the condition of the catalytic converter.

WO 95/17588 deals with checking the conversion capability of a catalytic converter in internal combustion engines of motor vehicles, with the checking being carried out by means of a temperature measurement in the direct vicinity downstream of the catalytic converter. Firstly, the temperature at the beginning and at the end of a predefined idle phase is measured over a predefined number of idle phases following an overrun phase of the motor vehicle; the difference between the temperature measurements is then calculated. The sum of all the temperature measurement results and the sum of the duration of the idle phases are calculated, and the average quotient is then calculated from said results. The average gradient determined in this way is compared with a limit value, with the catalytic converter being identified as being faulty if a predefined limit value is exceeded.

In JP 04 060106, the aging of a catalytic converter is assessed in that, during normal operation, the air/fuel ratio is moved toward the rich side of normal operation and it is checked whether the resulting rising temperature gradient is in an admissible range.

The invention of DE 43 30 997 A1 relates to a method for monitoring the light-off behavior of a catalytic converter system in the exhaust duct of an internal combustion engine. The light-off behavior of the catalytic converter system is dependent of the conversion capability of that region of the catalytic converter system through which the exhaust gases flow through first. According to DE 43 30 997 A1, the conversion capability of said region can be determined from the temperature profile that results if a mixture of air and unburned fuel is supplied to the catalytic converter system.

WO 01/49989 A1 describes an internal combustion engine, which is provided with a catalytic converter, for a motor vehicle. The catalytic converter can be acted on with hydrocarbons. A temperature sensor measures the temperature of the exhaust gas downstream of the catalytic converter. Additional air can be supplied to the exhaust gas upstream of the catalytic converter by means of a control unit. The control unit can infer the conversion capability of the catalytic converter from the resulting temperature increase of the exhaust gas in and/or downstream of the catalytic converter.

In EP 1 052 385 A2, to diagnose the hydrocarbon-oxidizing properties of a catalytic converter in the exhaust section of an internal combustion engine, an additional supply of fuel is carried out during an exhaust stroke of a cylinder of the internal combustion engine. The temperature profile of the exhaust gas downstream of the catalytic converter is monitored. If a temperature rise remains below a threshold value, the catalytic converter is diagnosed as being defective.

U.S. Pat. No. 6,408,616 B1 describes a method for determining the activity of a catalytic converter on board a vehicle. For this purpose, hydrocarbons are added to the exhaust gas upstream of the catalytic converter for a certain period of time, and the temperature increase as a result of the combustion of said hydrocarbons on the catalytic converter is measured. By means of a comparison with the expected temperature increase, it is possible to make a statement regarding the aging condition of the catalytic converter. The method requires in each case one thermal element upstream and downstream of the catalytic converter in order to measure the exhaust-gas temperatures. A disadvantage of said method is the fact that it can only detect already-present damage to the catalytic converter. It is not possible with said method to monitor the progressive aging of the catalytic converter. An assessment of the catalytic converter by means of said method can be carried out only at exhaust-gas temperatures close to the current light-off temperature of the catalytic converter. Therefore, any measurement is associated with an increased emission of unburned hydrocarbons.

It is an object of the present invention to specify a method for testing the aging condition of a catalytic converter, which method is capable of making a statement regarding the oxidation activity of a catalytic converter, and the aging condition thereof, on the basis of simple measurements.

Said object is achieved by means of the method as claimed in claim 1. The subclaims describe preferred embodiments.

The method as claimed in the main claim relates to testing the aging condition of a catalytic converter for cleaning the exhaust gases of a vehicle engine, the exhaust gas containing combustible components and testing being carried out on the vehicle under operating conditions. The method is characterized in that a delay between a change in the operating conditions and the resulting change in the exhaust-gas temperature downstream of the catalytic converter is determined, and the aging condition of the catalytic converter is inferred from the delay.

A change in the operating conditions of the catalytic converter leads to a change in the heat generated in the catalytic converter as a result of the catalytic conversion of the pollutants, and therefore also to a change in the exhaust-gas temperature downstream of the catalytic converter. Here, the exhaust-gas temperature downstream of the catalytic converter reacts in a delayed fashion to the change in the operating conditions. The reason for said delay is that the heat of reaction must firstly be generated within the catalytic converter and transported to the catalytic converter outlet by the exhaust gas. The magnitude of the delay observed is dependent on the position of the reaction zone and therefore on the position of the heat release profile in the catalytic converter. The position of the heat release profile is in turn dependent on the state of activity, or aging condition, of the catalytic converter. It is therefore possible to infer the state of activity of the catalytic converter from the measurable delay in the temperature profile with respect to time downstream of the catalytic converter.

According to the invention, therefore, the temperature profile with respect to time downstream of the catalytic converter resulting from a change in the operating conditions for the catalytic converter is measured. The observed delay between the beginning of the change in operating conditions and the occurrence of a characteristic feature of the temperature profile with respect to time of the exhaust gas downstream of the catalytic converter is preferably evaluated to assess the aging condition of the catalytic converter. A rising or falling flank of the temperature profile with respect to time or a maximum in the temperature profile with respect to time can be used as the characteristic feature.

For the practical implementation of the method, it is necessary to correlate the measured time delays with the activity of the catalytic converter. A simple solution is to use a table created beforehand, in which the aging condition is entered as a function of the measured delay, the operating condition of the catalytic converter before the beginning of the test being used as a parameter. Here, as a measure of the aging condition of the catalytic converter, it is for example possible to use its current light-off temperature. The operating condition of the catalytic converter is described by temperature, composition and mass flow of the exhaust gas before entry into the catalytic converter. These parameters are directly dependent on the rotational speed and load of the engine. The data in said table may be obtained either experimentally or by means of simulation calculations. A further option for correlating the measured delay with the aging condition of the catalytic converter is to use a mathematical model.

Alternatively, the delay of the characteristic feature for a limit catalytic converter can be calculated and compared with the measured delay to assess the aging condition of the catalytic converter. A limit catalytic converter is to be understood here to mean a catalytic converter with which it is still just possible for the exhaust-gas limit values for the legally prescribed driving cycles to be adhered to. U.S. Pat. No. 6,408,616 B1 describes inter alia how a catalytic converter of said type can be produced.

The operating conditions for the catalytic converter are preferably changed by increasing the concentration of combustible components in the exhaust gas before entry to the catalytic converter during a time period $\Delta t$. The combustible components of the exhaust gas include the known pollutants carbon monoxide (CO), hydrocarbons (HC) and hydrogen ($H_2$). The concentration of combustible components in the exhaust gas may be increased in a simple manner by means of engine-internal measures, for example by post-injection of fuel into the vehicle engine or by introducing fuel into the exhaust gas between the vehicle engine and the catalytic converter.

The increase in the concentration of combustible components of the exhaust gas determines the temperature increase to be measured at the outlet of the catalytic converter. For reliable determination of the temperature profile with respect to time, it is therefore advantageous for the concentration to be increased to such an extent that the temperature profile downstream of the catalytic converter has an amplitude of at least 5° C., preferably of at least 10° C. It is particularly preferable for a pollutant concentration to be selected which ensures an amplitude of the temperature profile downstream of the catalytic converter of between 20 and 50° C. If the amplitude of the temperature profile exceeds approximately 50° C., there is the risk of the catalytic converter being thermally damaged as a result of the test itself.

It is particularly suitable for the concentration of combustible components in the exhaust gas, in particular of carbon monoxide and/or hydrocarbons, to be increased only briefly. The brief increase in the pollutant concentration in the exhaust gas is referred to below as a pollutant pulse or CO/HC pulse, and the temperature profile with respect to time downstream of the catalytic converter is referred to as the temperature profile with respect to time. The duration of the pollutant pulse $\Delta t$ selected may be between 1 and 10 seconds. $\Delta t$ should at any rate be considerably shorter than the time required for the axial temperature profile to travel from the inlet to the outlet of the catalytic converter. $\Delta t$ should preferably amount to only one tenth to one quarter of the travelling time of the temperature profile.

The profile with respect to time of the exhaust-gas temperature downstream of the catalytic converter is influenced, as well as by the heat of reaction generated in the catalytic converter, by the profile with respect to time of the exhaust-gas temperature before entry into the catalytic converter. As shown further below, the measurement time for the temperature profile downstream of the catalytic converter is approximately 1 minute under normal conditions. During said time, the operating state of the vehicle engine may change and thereby distort the measurements. Testing of the aging condition of the catalytic converter is therefore preferably carried out when the vehicle is being operated under constant operating conditions, that is to say for example during a relatively long period of freeway driving. If the operating conditions change significantly during the test period, the test result is discarded.

However, it is not necessary for the test result to be discarded under changing operating conditions if fluctuating operating conditions of the vehicle during testing are taken into account by the fact that, for the operating conditions during testing, the expected temperature profile downstream of the catalytic converter is calculated without increasing the concentration of combustible components and is subtracted from the measured temperature profile.

The invention will be explained below for the situation in which short pollutant pulses are used to change the operating conditions of the catalytic converter. The circumstances present here will be explained on the basis of FIGS. 1 to 7.

FIG. 1 shows a schematic illustration of the pollutant conversion (in this case the combustion of the combustible components of the exhaust gas) of a catalytic converter as a function of the catalytic converter temperature, for three different aging conditions I, II and III. The light-off temperatures for the respective aging condition can be determined from such curves. I denotes, for example, the conversion curve for a fresh catalytic converter, while III is the conversion curve for a significantly damaged catalytic converter. In general, even in a catalytic converter whose pollutant conversion no longer satisfies the legal requirements, there are temperature ranges above the light-off temperature in which the pollutant conversion is still close to the pollutant conversion of a fresh catalytic converter. Said range is indicated in FIG. 1 for example by M.

Figure 1:
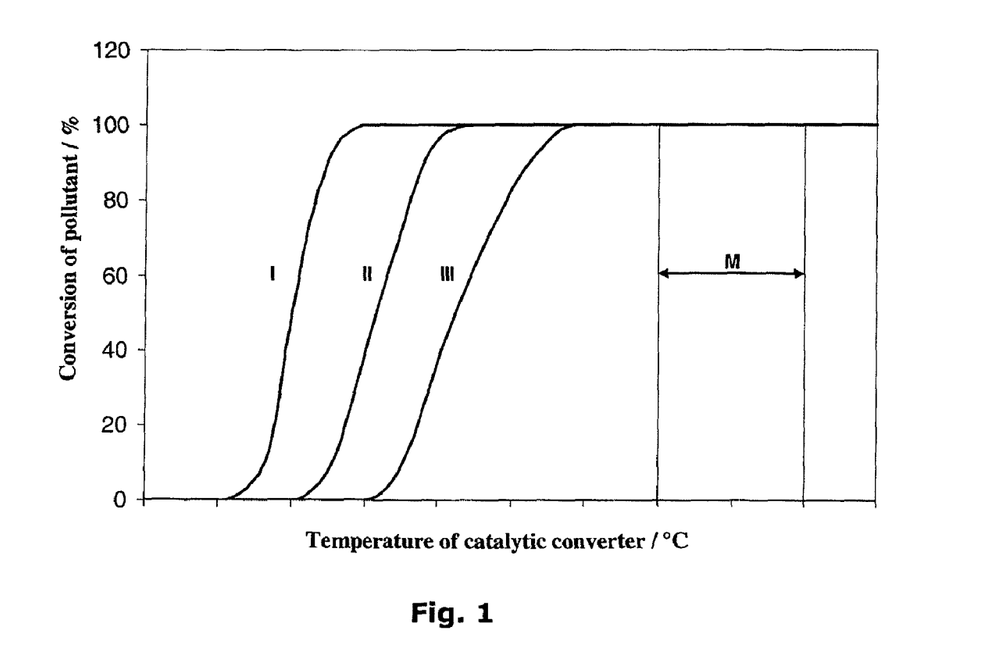
FIG. 1: Schematic illustration of the pollutant conversion of a catalytic converter as a function of the temperature thereof, for three different aging conditions

Testing is therefore preferably performed at exhaust-gas temperatures before entry into the catalytic converter in a range in which even the aged catalytic converter still exhibits conversion rates for the combustible components similar to a fresh catalytic converter. In this way, undesired pollutant emissions as a result of the test are substantially eliminated, since the catalytic converter is sufficiently active at said exhaust-gas temperatures to fully convert the pollutants which are additionally introduced for the test.

The conversion of, for example, carbon monoxide (CO) and hydrocarbons (HC) on high-grade metal catalytic converters is inhibited by said substances themselves. The catalytic conversion of said exhaust-gas components is thus a self-accelerating process: once a part of the pollutants has been converted, this accelerates the further reaction. On account of this self-accelerating characteristic, the conversion does not take place in a uniformly distributed manner over the entire catalytic converter, but rather a locally limited axial heat release profile is formed along the catalytic converter, and an axial temperature profile is therefore formed in the catalytic converter.

If the exhaust-gas temperature at the inlet into the catalytic converter is considerably higher than the light-off temperature of the latter, then the combustible components are burned completely over only a short path downstream of the catalytic converter inlet, and heat the catalytic converter along this path. The exhaust gas then comes into contact, downstream, with the still relatively cool parts of the catalytic converter and dissipates any entrained heat to the catalytic converter. Shortly after the beginning of the pollutant pulse, therefore, the exhaust gas emerging from the catalytic converter therefore does not have an increased temperature even though the running time of the exhaust gas through the catalytic converter lasts only fractions of seconds at the spatial velocities conventional for exhaust-gas cleaning. After the end of the pollutant pulse, the axial temperature profile travels only gradually to the outlet of the catalytic converter. Said travelling takes place in interaction with the exhaust gas flowing through the catalytic converter and is influenced by the thermal properties of the catalytic converter, in particular by its thermal conductivity and its heat capacity.

Figure 2:
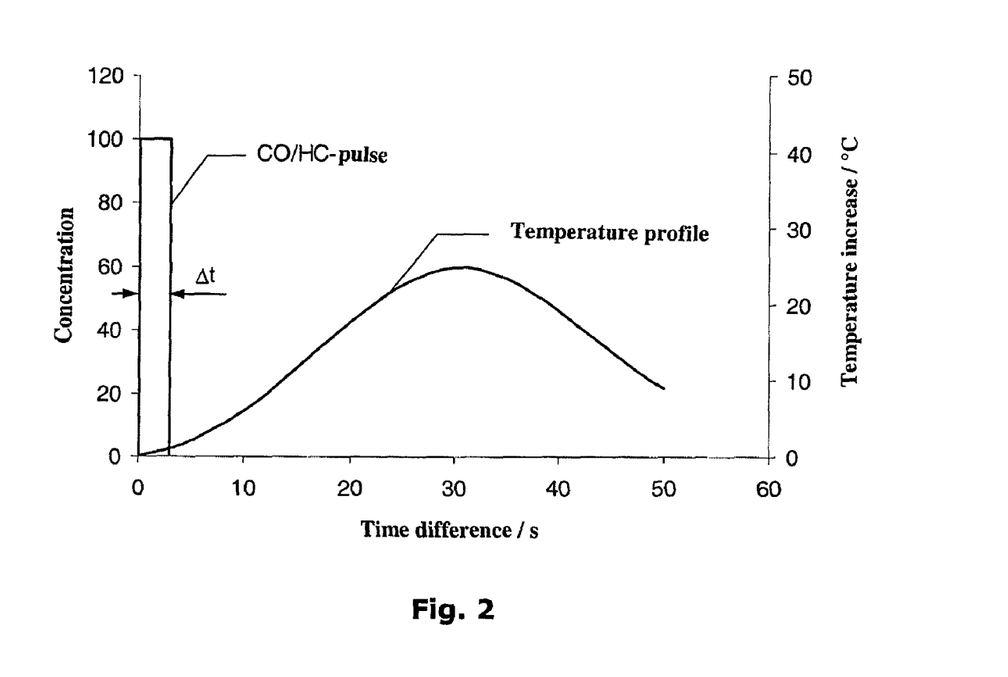
FIG. 2: Schematic illustration of pollutant pulse, and temperature profile with respect to time downstream of the catalytic converter

FIG. 2 shows a schematic illustration of the pollutant pulse (in this case CO/HC pulse) and the temperature profile downstream of the catalytic converter as a function of the time difference between the beginning of the pollutant pulse and the present time. The test begins with the concentration of the combustible pollutant components of the exhaust gas upstream of the catalytic converter being briefly increased during a time period $\Delta t$. The measurement of the temperature increase downstream of the catalytic converter begins at the same time. The more active the catalytic converter is at the selected exhaust-gas temperature, the later the temperature of the exhaust gas rises downstream of the catalytic converter, because in the case of an active catalytic converter, the added pollutants are converted already a short distance downstream of the inlet into the catalytic converter, and increase the temperature of the catalytic converter at that point. A significant increase in temperature of the exhaust gas downstream of the catalytic converter first takes place once the heated zone of the catalytic converter has travelled, as a result of heat conduction and as a result of interaction with the exhaust gas, to the catalytic converter outlet. In contrast, if the exhaust-gas temperature at the inlet of the catalytic converter corresponds exactly to the light-off temperature, then the conversion of the pollutants is distributed along the entire catalytic converter in such a way that exactly 50% of the pollutants have been converted at the catalytic converter outlet. The pollutant conversion at the outlet of the catalytic converter leads to a very fast rise in the exhaust-gas temperature downstream of the catalytic converter on account of the high spatial velocity of the exhaust gas. Therefore: the more active the catalytic converter is at the inlet temperature of the exhaust gas, the later the temperature profile of the exhaust gas downstream of the catalytic converter reaches its maximum.

These relationships make it possible to determine the axial heat release profile in the catalytic converter from the temperature profile with respect to time downstream of the catalytic converter. The calculations required for this purpose are known to a person skilled in the art. From the heat release profile in the catalytic converter, it is finally possible to determine the current light-off temperature for the added pollutants.

For the test, the pollutant concentration in the exhaust gas is briefly raised. There is therefore the risk of the test increasing the pollutant emission of the vehicle. This may be substantially prevented if testing is carried out only at exhaust-gas temperatures which lie above the light-off temperature of the catalytic converter. The oxidation activity of a catalytic converter decreases with progressive aging, and the light-off temperature increases. Testing is therefore preferably carried out only at exhaust-gas temperatures which are greater than the current light-off temperature of the catalytic converter ascertained during the previous test. Testing is particularly preferably carried out at exhaust-gas temperatures which are 10 to 100° C., in particular 10 to 50° C. above the current light-off temperatures of the catalytic converter ascertained during the previous test.

In a preferred embodiment of the method, the object of the invention is achieved by means of the following method steps:
a) addition of additional combustible components to the exhaust gas before entry into the catalytic converter during a time period $\Delta t$,
b) measurement of a temperature profile with respect to time of the exhaust gas downstream of the catalytic converter owing to the development of heat during the combustion of the additional combustible components at the catalytic converter,
c) obtaining a time difference between the beginning of addition of the combustible components and the occurrence of a maximum in the temperature profile downstream of the catalytic converter, and
d) setting a signal to indicate that the catalytic converter is severely damaged if the time difference falls below a predetermined value.

Figure 7:
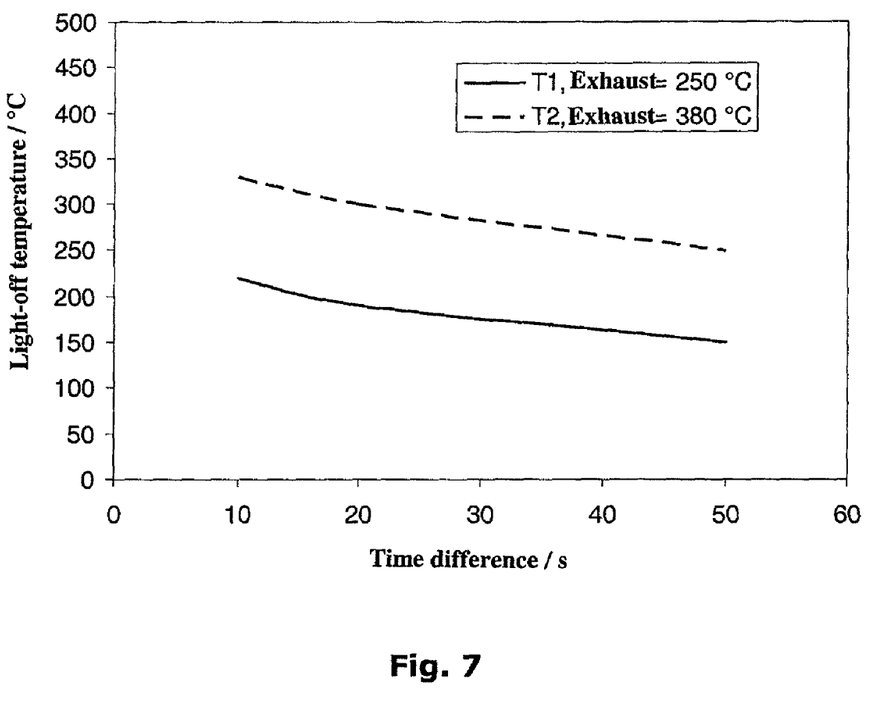
FIG. 7: Illustration of the basic dependency of the light-off temperature on the measured time difference between the beginning of testing and the occurrence of the maximum of the temperature profile with respect to time downstream of the catalytic converter

In this case, the present light-off temperature of the catalytic converter may be determined as follows: beforehand, a table for the catalytic converter under consideration is created which contains the light-off temperature of the catalytic converter for different aging conditions as a function of the time difference measured according to the invention. Here, the operating state of the engine, with load and rotational speed, is used as a parameter. FIG. 7 shows the graphic illustration of the data in such a table, wherein by way of example, only the exhaust-gas temperature before the beginning of testing has been used as a parameter. From said diagram, with a known inlet temperature of the exhaust gas and with the measured time difference, the present light-off temperature can be read off and used for the selection of the exhaust-gas temperature during the next test.

Alternatively, the present light-off temperature may be determined by means of simulation calculations from the measured temperature profile with respect to time.

The addition of the additional combustible components to the exhaust gas before entry into the catalytic converter may take place in various ways: by means of engine-internal measures such as for example by post-injection of fuel, a late combustion position or multi-stage combustion; by an introduction of fuel into the exhaust line or by an addition of a hydrogen-rich gas obtained from fuel by reforming.

EXAMPLE

The processes in the catalytic converter during testing are analyzed by means of a commercial calculation program, assuming a pure CO pulse as a pollutant pulse. The results of said simulation calculations are illustrated in the following FIGS. 3 to 6 and serve for further explanation of the invention.

Figure 3:
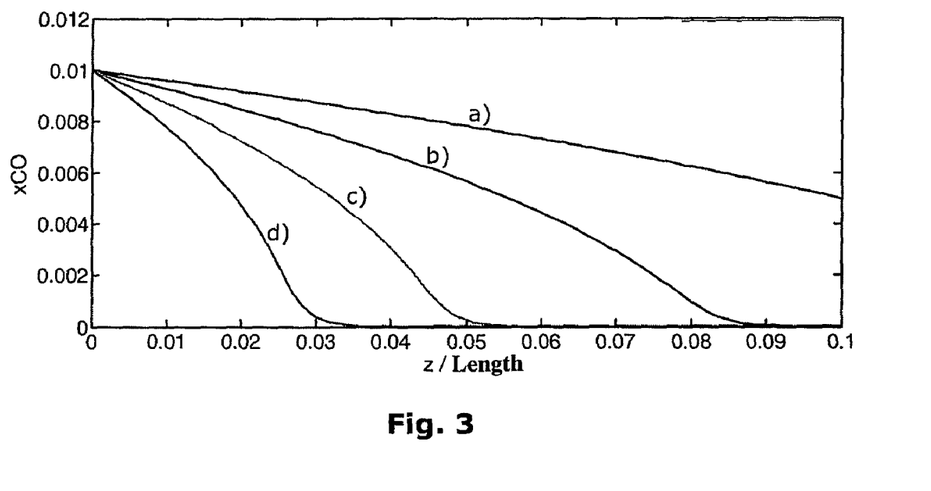
FIG. 3: Carbon monoxide profiles in the catalytic converter for different temperatures above the light-off temperature
Figure 4:
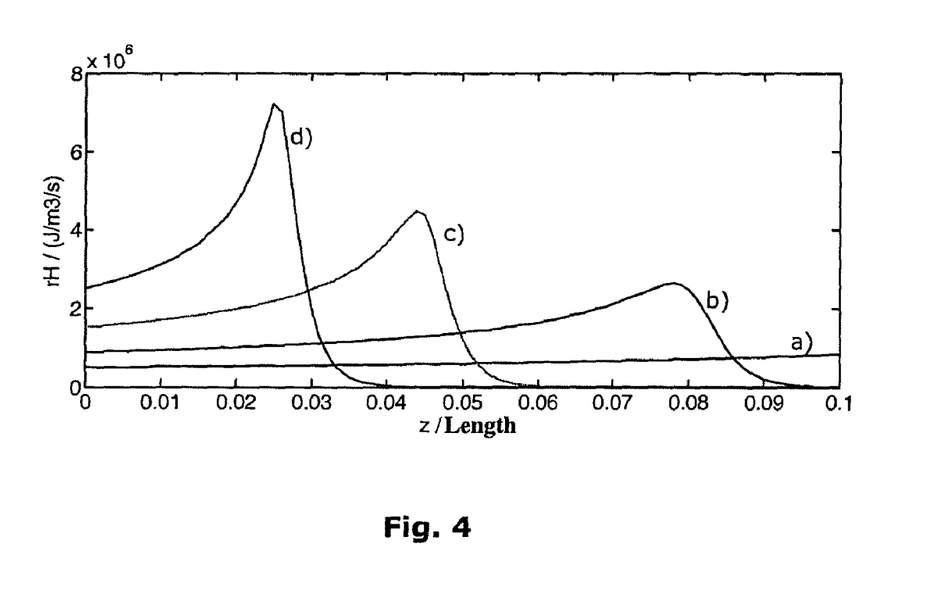
FIG. 4: Heat release profiles

FIGS. 3 and 4 show concentration profiles for carbon monoxide and the corresponding heat release profiles in the catalytic converter for steady-state exhaust-gas conditions, assuming a light-off temperature of the catalytic converter for carbon monoxide of 200° C., a constant concentration of carbon monoxide upstream of the catalytic converter of 1 vol.-% and a spatial velocity of the exhaust gas of 36,000 $h^{-1}$, corresponding to a ten-fold exchange of the exhaust gas in the catalytic converter per second. The length of the catalytic converter was defined as 10 cm (0.1 m). The calculations were carried out for four different exhaust-gas temperatures before entry into the catalytic converter:

curves a): $T_{exhaust\_gas}$=200° C. (corresponds to light-off temperature)
curves b): $T_{exhaust\_gas}$=220° C.
curves c): $T_{exhaust\_gas}$=240° C.
curves d): $T_{exhaust\_gas}$=260° C.

FIG. 3 shows the calculated concentration profiles of carbon monoxide along the catalytic converter. If the exhaust-gas temperature is equal to the light-off temperature (curve (a)), then by definition, carbon monoxide is only 50% converted at the end of the catalytic converter. For temperatures from 20° C. above the light-off temperature, the carbon monoxide is already converted completely in the catalytic converter. With increasing exhaust-gas temperature, the conversion is displaced ever further toward the catalytic converter inlet. Here, the self-acceleration of the oxidation of carbon monoxide with increasing conversion of carbon monoxide on the high-grade metal catalytic converter can be clearly seen: the conversion of carbon monoxide is accelerated as the concentration in the exhaust gas becomes lower.

FIG. 4 shows the heat release profiles which result from the concentration profiles of FIG. 3. It can also be seen here that the heat release takes place not uniformly over the entire catalytic converter but rather in a locally delimited fashion. For exhaust-gas temperatures above the light-off temperature, it is possible to see a clearly pronounced maximum on account of the self-acceleration. The position of the maximum is displaced in the direction of the inlet of the catalytic converter with increasing exhaust-gas temperature.

In principle, it is therefore possible to make a statement regarding the light-off temperature of the catalytic converter by measuring the temperature profile along the catalytic converter. For this purpose, however, the temperature profile must be determined with sufficient accuracy by means of a plurality of measuring points along the catalytic converter. This is technically complex and involves considerable costs.

In contrast, according to the invention, only the temperature profile with respect to time downstream of the catalytic converter is measured, using one temperature measuring probe. Said temperature measuring probe can be easily positioned at a location at which all the flow strands emerging from the catalytic converter are well mixed with one another and thereby allow a reliable temperature measurement. The measurement of the temperature profile with respect to time downstream of the catalytic converter makes it necessary, however, to briefly load the catalytic converter with a higher concentration of combustible exhaust-gas components. The change in the exhaust-gas temperature with respect to time downstream of the catalytic converter can then be easily measured.

Figure 5:
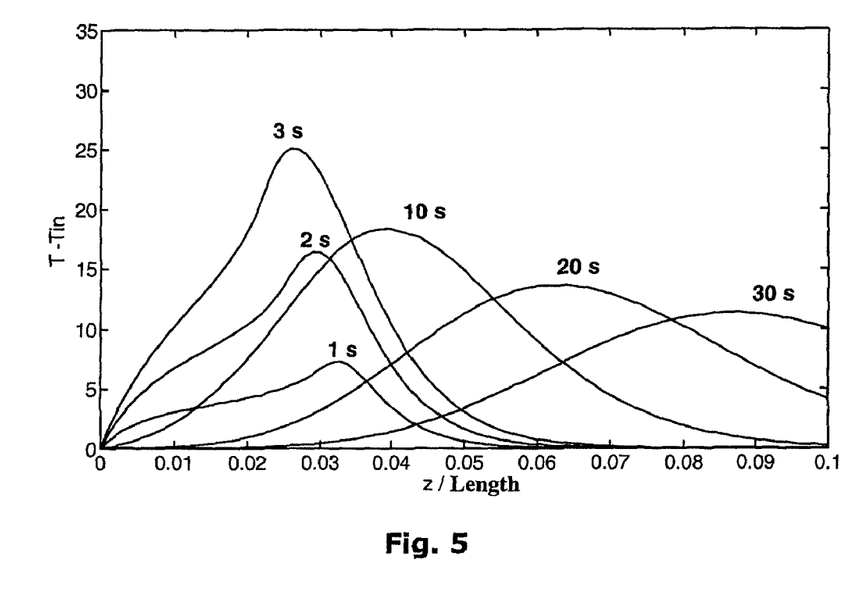
FIG. 5: Development over time of the temperature profile in the catalytic converter
Figure 6:
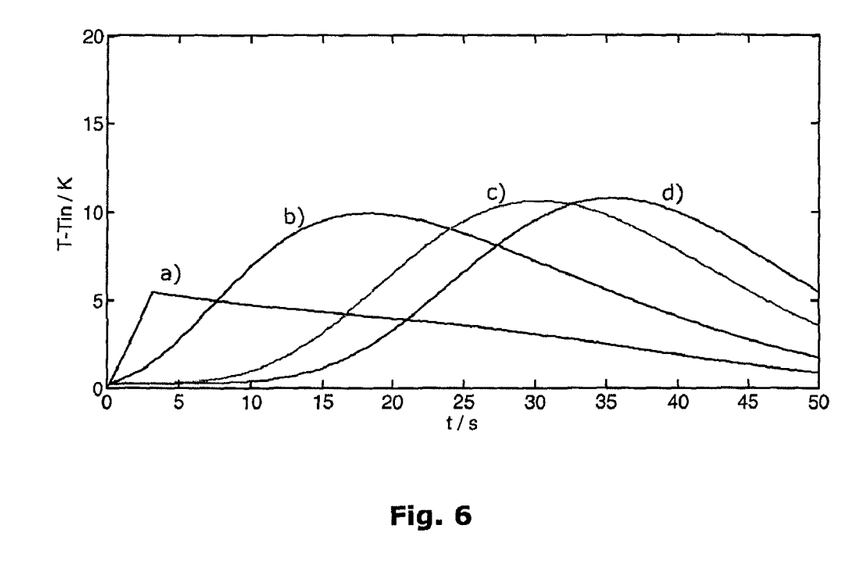
FIG. 6: Development over time of the temperature at the catalytic converter outlet after a CO pulse of 3 seconds duration

For the simulation calculations of FIGS. 5 and 6, the same assumptions with regard to light-off temperature, spatial velocity and catalytic converter length have been made as for the steady-state calculations of FIGS. 3 and 4. In contrast to the steady-state calculations, it has been assumed now that only a pulsed addition of carbon monoxide to the exhaust gas upstream of the catalytic converter is provided, with a pulse duration of 3 seconds and a concentration of carbon monoxide in the pulse of 1 vol.-%.

FIG. 5 shows the calculated axial profiles of the catalytic converter temperature for an exhaust-gas temperature upstream of the catalytic converter of 240° C. and different times after the beginning of the CO pulse. The difference between the catalytic converter temperature T prevailing at the respective location along the catalytic converter and the exhaust-gas temperature $T_{in}$ upstream of the catalytic converter is plotted on the ordinate. Since the exhaust-gas temperature $T_{in}$ lies considerably above the light-off temperature (200° C.), the carbon monoxide of the CO pulse is burned completely already in the first half of the catalytic converter, and generates an axial temperature profile in the catalytic converter, which substantially corresponds to the heat-release profile. In interaction with the exhaust gas and as a result of the thermal properties of the catalytic converter, the temperature profile in the catalytic converter travels downstream to the catalytic converter outlet and broadens in the process. After approximately 30 seconds, the maximum of the temperature profile has reached the catalytic converter outlet.

At the outlet of the catalytic converter, the local temperature profile can be measured as a time-dependent temperature profile. The resulting temperature profiles with respect to time downstream of the catalytic converter are illustrated in FIG. 6 for the above-stated four different exhaust-gas temperatures a), b), c) and d) upstream of the catalytic converter. The further the exhaust-gas temperature lies above the light-off temperature of the catalytic converter, the greater the time difference is between the start of the addition of carbon monoxide and the occurrence of the maximum of the temperature profile with respect to time downstream of the catalytic converter.

The method according to the invention requires at least one temperature sensor for measuring the exhaust-gas temperature downstream of the catalytic converter. The exhaust-gas temperature upstream of the catalytic converter is preferably calculated by the engine controller from the present operating data. Alternatively, a second temperature sensor may also be provided upstream of the catalytic converter. Only low demands are made on the temperature sensors, in particular on the temperature sensor downstream of the catalytic converter, with regard to measurement accuracy and durability, since it is essentially not the absolute magnitude of the temperature that is of importance but rather merely the time delay for example of the occurrence of the maximum in the temperature profile.

It is an advantage of the proposed method that it can operate at a temperature considerably higher than the light-off temperature, such that a complete conversion of the pollutant pulse is obtained even in the case of a damaged catalytic converter. In this way, it is possible to prevent additional emissions as a result of the test.

The invention claimed is:

1. A method for testing the aging condition of a catalytic converter for cleaning the exhaust gases of a vehicle engine, the exhaust gas containing combustible components and testing being carried out on the vehicle under operating conditions, which comprises
    determining a delay between a change in the operating conditions and the resulting change in the exhaust-gas temperature downstream of the catalytic converter, and inferring the aging condition of the catalytic converter from the delay; and
    evaluating the delay between the beginning of the change in the operating conditions for the catalytic converter and the occurrence of a characteristic feature of the temperature profile with respect to time of the exhaust gas downstream of the catalytic converter to assess the aging condition of the catalytic converter;
    wherein the characteristic feature is a rising or falling flank of the temperature profile with respect to time or a maximum in the temperature profile with respect to time.

2. The method as claimed in claim 1, wherein the aging condition of the catalytic converter is obtained from the measured delay with the aid of a table created beforehand, in which the aging condition is entered as a function of the measured delay, the operating state of the catalytic converter before the beginning of the test being used as a parameter.

3. The method as claimed in claim 2, wherein the data in the table are obtained experimentally or by means of simulation calculations.

4. The method as claimed in claim 1, wherein the aging condition of the catalytic converter is determined from the measured delay with the aid of a mathematical model.

5. The method as claimed in claim 1, wherein the delay of the characteristic feature for a limit catalytic converter is calculated and compared with the measured delay to assess the aging condition of the catalytic converter.

6. The method as claimed in claim 1, wherein the operating conditions of the catalytic converter are changed for the test by increasing the concentration of combustible components in the exhaust gas before entry to the catalytic converter during a time period $\Delta t$.

7. The method as claimed in claim 6, wherein the combustible components contain carbon monoxide and/or hydrocarbons.

8. The method as claimed in claim 7, wherein the concentration of combustible components in the exhaust gas is increased by post-injection of fuel into the vehicle engine or by introducing fuel into the exhaust gas between the vehicle engine and the catalytic converter.

9. The method as claimed in claim 6, wherein the concentration of combustible components in the exhaust gas is increased to such an extent that the temperature profile downstream of the catalytic converter has an amplitude of at least 5° C. owing to combustion at the catalytic converter.

10. The method as claimed in claim 6, wherein the time period $\Delta t$ selected is between 1 and 10 seconds.

11. The method as claimed in claim 6, wherein testing of the aging condition is carried out when the vehicle is being operated under constant operating conditions.

12. The method as claimed in claim 6, wherein fluctuating operating conditions of the vehicle during testing are taken into account by the fact that, for the operating conditions during testing, the expected temperature profile downstream of the catalytic converter is calculated without increasing the concentration of combustible components and is subtracted from the measured temperature profile.

13. The method as claimed in claim 1, wherein testing is performed only at exhaust-gas temperatures upstream of the catalytic converter in a range in which even the aged catalytic converter still exhibits conversion rates for the combustible components similar to a fresh catalytic converter.

14. The method as claimed in claim 1, wherein the following steps are carried out,
    a) addition of additional combustible components to the exhaust gas before entry into the catalytic converter during a time period $\Delta t$,
    b) measurement of a temperature profile with respect to time of the exhaust gas downstream of the catalytic converter owing to the development of heat during the combustion of the additional combustible components at the catalytic converter,
    c) obtaining a time difference between the beginning of addition of the combustible components and the occurrence of a maximum in the temperature profile downstream of the catalytic converter, and
    d) setting a signal to indicate that the catalytic converter is severely damaged if the time difference falls below a predetermined value.

15. The method as claimed in claim 14, wherein the measured time difference between the beginning of addition of the combustible components and the occurrence of a maximum in the temperature profile downstream of the catalytic converter is used to obtain the current light-off temperature of the catalytic converter from a table created beforehand, in which the light-off temperatures are entered as a function of the measured time difference, the operating state of the engine being used as a parameter.

16. The method as claimed in claim 15, wherein testing is carried out only at exhaust-gas temperatures upstream of the catalytic converter which are greater than the current light-off temperature of the catalytic converter ascertained during the previous test.

17. The method as claimed in claim 16, wherein testing is carried out only at exhaust-gas temperatures upstream of the catalytic converter which are 10 to 100° C. above the current light-off temperature of the catalytic converter ascertained during the previous test.

* * * * *